United States Patent [19]

Ogawa et al.

[11] Patent Number: 5,372,890
[45] Date of Patent: Dec. 13, 1994

[54] ORGANOPOLYSILOXANE COMPOSITION FOR THE PRODUCTION OF RELEASE PAPER

[75] Inventors: Masahiko Ogawa; Masanao Kamei, both of Gunma, Japan

[73] Assignee: Shin-Etsu Chemical Co., Ltd., Tokyo, Japan

[21] Appl. No.: 84,972

[22] Filed: Jul. 2, 1993

[30] Foreign Application Priority Data

Jul. 2, 1992 [JP] Japan ................... 4-199262

[51] Int. Cl.$^5$ ............ B32B 9/04; C08G 77/06; C08G 77/12; C08G 77/20
[52] U.S. Cl. ................... 428/447; 528/15; 528/31; 528/32
[58] Field of Search ............ 528/15, 31, 32; 428/447

[56] References Cited

U.S. PATENT DOCUMENTS

| | | | |
|---|---|---|---|
| 4,721,764 | 1/1988 | Fujiki et al. | 528/15 |
| 4,764,576 | 8/1988 | Ogawa et al. | 524/265 |
| 5,204,437 | 4/1993 | Ikeno et al. | 528/15 |

OTHER PUBLICATIONS

Abstract of JP 61-141553.
Abstract of JP 3-131676.
Abstract of JP 63-56561.

Primary Examiner—Melvyn I. Marquis
Assistant Examiner—Karen A. Dean
Attorney, Agent, or Firm—Millen, White, Zelano, & Branigan

[57] ABSTRACT

The invention provides organopolysiloxane compositions for a releasable substrate which are superior in curability, anti-static property, oil resistance, and slipperiness, and provide a good releasability to the treated objects, said composition comprising (1) 100 parts by weight of an organopolysiloxane which comprises at least two alkenyl groups and 5 to 50 mol % of a chemical unit expressed by formula (I)

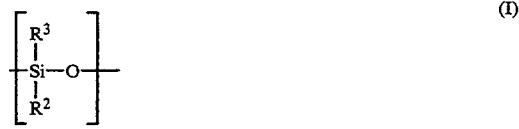

(2) 1 to 100 parts by weight of an organohydrogen polysiloxane which comprises at least three hydrogen atoms bonded to silicon atoms per molecule, and (3) a catalytic amount of platinum or platinum compound.

6 Claims, No Drawings

ORGANOPOLYSILOXANE COMPOSITION FOR THE PRODUCTION OF RELEASE PAPER

BACKGROUND OF THE INVENTION

This invention relates to the organopolysiloxane compositions for the production of release paper. The compositions have good curability, anti-static properties, oil resistance, and slipperiness, and provide a good releasability (i.e., peelability) to the treated objects.

Conventionally known release papers utilize substrates of a film and sheet type, which are made of celluloses, synthetic resins, and synthetic fibers and with their surfaces coated with releasable silicone. However, these papers tend to be charged by static electricity, especially those with films of polyester and oriented polypropylene (OPP) which are easily charged by friction. This leads to handling problems such as dust adhesion on coated surfaces and blocking between films. When the film with a cured coating is applied to electric parts, it causes trouble such as noise.

Therefore, methods have been proposed to employ undercoating layers which prevent buildup of electrostatic charge on the substrate films and sheets prior to their coating with silicone. Such methods include employing a partially hydrolyzed polysiloxane (Japanese patent application KOKAI (laid open) 61-141553), coating with surfactants, and coating with resin layers which comprise an electroconductive powder such as metals and carbon (Japanese patent application KOKOKU (examined) 62-18448). Further, similar treatments on the back surfaces of these films and sheets are also known.

However, the preparation of silicone coatings which possess an anti-static property by the above methods requires two coating procedures, therefore they are disadvantageous from the viewpoint of production and cost. In addition, the employment of an undercoating layer will negatively affect the curability and adhesiveness of the silicone films which provide releasability.

SUMMARY OF THE INVENTION

This invention provides peelable organopolysiloxane compositions and solves the above disadvantages. The compositions comprise (1) preferably about 100 parts by weight of an organopolysiloxane which has at least two alkenyl groups and about 5 to 50 mol % of the chemical unit expressed by the general formula (I)

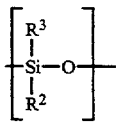
(I)

wherein $R^2$ is independently selected from a methyl group, an ethyl group, a propyl group or a 3,3,3-trifluoropropyl group, (2) preferably about 1 to 100 parts by weight of an organohydrogen polysiloxane which has at least three hydrogen atoms bonded to silicon atoms per molecule, and (3) a catalytic amount of platinum or a platinum compound.

The organopolysiloxane compositions for release paper possess a good curability, anti-static property, oil resistance, and slipperiness and provide a good releasability to the treated objects. When the compositions comprise (1) an organopolysiloxane which has at least two alkenyl groups as well as 5 to 50 mol % of the siloxane unit expressed by the general formula (1), (2) an organohydrogen polysiloxane which comprises at least three $\equiv$SiH groups per molecule, and (3) a platinum or platinum compound as an addition reaction catalyst, they offer a good curability due to curing by reaction between alkenyl groups in the component (1) and the $\equiv$SiH groups in the component (2) in the presence of component (3). Further, the cured coating films manifest good releasabilities, lubricity, and anti-static properties, since the component (1) possesses the organic groups expressed by $R^2$ and the cyanoalkyl group expressed by $R^3$.

The organopolysiloxane as the first component used to construct the peelable organopolysiloxane compositions of this invention has at least two alkenyl groups as well as 5 to 50 mol % of the siloxane unit expressed by the general formula I. This organopolysiloxane may be one expressed by the formula:

Ia wherein each $R^1$ is independently a hydroxyl group, a vinyl group or a methyl group. $R^2$ and $R^3$ are the groups as described before, a is defined as $0.95 \leq a \leq 0.5$, and b is defined as $0.05 \leq b \leq 0.5$). An example is shown by the general formula Ib

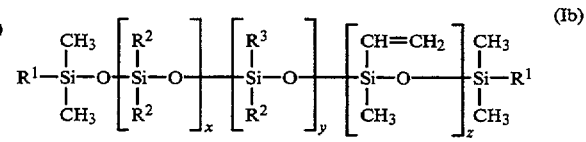
(Ib)

In the organopolysiloxane expressed by the general chemical formula (Ib), each $R^1$ is independently selected from a hydroxyl group, a methyl group or a vinyl group, each $R^2$ is independently selected from a methyl group, an ethyl group, a propyl group, or a 3,3,3-trifluoropropyl group, and $R^3$ is a cyanoalkyl group, preferably having 1-8 carbon atoms in the alkylene portion, such as a cyanoethyl and cyanopropyl. Each of x, y, and z is a number which is defined by the following ranges: $0.4 \leq x/(x+y+z) \leq 0.95$, $0.05 \leq y/(x+y+z) \leq 0.5$, and $0 \leq z/(x+y+z) \leq 0.1$. $R^2$ is desirably a methyl group.

Further, the organohydrogen polysiloxane, the second component of the peelable organopolysiloxane compositions of the invention, must have at least three hydrogen atoms bonded to silicon atoms (three $\equiv$SiH groups) per molecule. The average unit equation is, for example, shown as

(II)

wherein $R^4$ is a monovalent hydrocarbon group which is selected from: alkyl groups such as methyl, ethyl, propyl isopropyl, butyl, isobutyl, and amyl hexyl; cycloalkyl groups such as cyclopentyl, and cyclohexyl; aryl groups such as phenyl and naphthyl; alkaryl groups such as tolyl, xylyl, ethylphenyl, and mesityl; aralkyl groups such as benzyl and phenylethyl; a 3,3,3-trifluoropropyl group; and a cyanoethyl group, c and d are numbers defined by $0 \leq c \leq 3$ and $0 \leq d \leq 3$, respectively, and further by $1.5 \leq c+d \leq 3$. At least 80 mol % of $R^4$ is desirably a methyl group in order to obtain optimal compatibility and curability.

Examples of the organohydrogen polysiloxane are homopolymers and copolymers which comprise a $CH_3HSiO$ unit, $HSiO_{1.5}$ unit, $(CH_3)_2SiO$ unit, $CH_3SiO_{0.5}$ unit, $(CH_3)_2HSiO_{0.5}$ unit, or $(CH_3)_3SiO_{0.5}$ unit. These molecules may be linear, branched or cyclic, and their viscosity is preferably in the range from about 10 to 500 cS at 25° C.

Application of less than 1 weight part of the second component, against the 100 parts by weight of the first component organopolysiloxane, may result in less than optimal curing of the composition, leading to the migration of the silicone to the back surface. On the other hand, addition of more than 100 parts by weight may impair the characteristics of the cured coating film, such as slipperiness and releasability. Therefore, the content of this component is preferably in the region from about 1 to 100 parts by weight, more desirably from 5 to 50 parts by weight.

The third component for the peelable organopolysiloxane compositions of this invention functions as a catalyst in order to promote the addition reaction of alkenyl groups in the component (1) and $\equiv SiH$ groups in the component (2). The third component comprises platinum or known platinum compounds. Examples of platinum compounds are chloroplatinic acids such as hydrogen tetrachloroplatinate and hydrogen hexachloroplatinate, compounds of chloroplatinic acids with alcohols and aldehydes, and complex salts of chloroplatinic acids with various olefins and vinyl siloxanes.

The third component is added in a catalytic amount. For good quality in the cured coating films and from an economical view point, the amount of platinum against the organopolysiloxane is preferably in the range of about 1 to 1,000 ppm, more desirably from 2 to 500 ppm, calculated as platinum metal.

The peelable organopolysiloxane compositions of this invention can be obtained by uniformly mixing the appropriate amounts of the said components (1) through (3). Retarders may be added in order to control the addition reaction rate of the first and the second components. Such retarders are conventional and are acetylene compounds, oxime compounds, organic halogen compounds and organic nitrogen compounds. The viscosity of the organopolysiloxane compositions of this invention obtained by this method are conventionally determined depending upon the coating amount, coating method, and types of the coated substrates such as polyethylene laminated paper, glassine paper, polyester and polypropylene. In general, at most 1,000 cps of viscosity at 25° C. is desirable for good workability during the coating process, although higher or lower viscosities are useable and conventionally produceable.

For the formation of release coating films on the surfaces of the substrates to be treated, the compositions may be coated onto the surfaces of the substrates using known techniques, for example, with a roll coater. The thickness of the coating films is desirably in the range from 0.05 to 2 μm after curing, although higher or lower values are useable and may conventionally be determined by one of ordinary skill in the art. The films are conventionally used, e.g., by heat treatment. Heat treatment of the coated substrates at 80° C. or above, more desirably at 100° C. or above for at least 15 seconds will cure the coating films.

The cured coating films prepared on the substrates by the above method possess not only a superior adhesivity towards the substrates but also a good releasability, anti-static property, lubricity, and slipperiness. Therefore, they are widely applicable as a medical tack paper, a friction sheet in a cassette tape and in other electronic industry related fields.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Japanese No. 4-199262, filed Jul. 2, 1992, are hereby incorporated by reference.

EXAMPLES

Example 1

In the following section, a synthesis example of the first component which constructs the compositions of this invention, examples of this invention, and a comparison example are presented. In these examples, the viscosity values were measured at 25° C. Physical properties in the examples were the results obtained by the following measurements.

Curability

After coating a surface of a substrate (which was a thin membrane like film or sheet) with an appropriate amount of the composition, the substrate was heat treated at a specified temperature for a specified period of time in a hot air circulation oven. Curability is determined by the time (seconds) required to form a completely cured coating film. The curing point is judged by rubbing the coated surface lightly with a finger, at which time a completely cured film neither rubs off nor smears.

Release Force

After coating a surface of a substrate (which was a thin membrane like film or sheet) with an appropriate amount of the composition and heat treating it at a specified temperature for a specified period of time in a hot air circulation oven, the cured coating film surface was further coated with the acrylic type adhesive Oribain BPS-5127 (trade name, manufactured by Toyo Ink Mfg. Co., Ltd.) and is heat treated for three minutes at 100° C. Then, a labeled paper with a weight of 64 g/m2 is adhered onto the treated surface, which is then aged for a day under a weight of 20 g/cm² at 25° C. Test pieces were prepared by cutting into 5 cm wide segments. They are pulled from 180° directions at 0.3 m/min of release rate using a tensile tester and the force (g) required for release is measured.

Adhesion of the Coating Film to the Substrate

After coating a surface of a substrate (which is a thin membrane like film or sheet) with an appropriate amount of the composition and heat treating it at a specified temperature for a specified period of time in a hot air circulation oven, it is placed in a room with a constant temperature (25° C.) and a constant humidity (60%). Adhesivity is measured by rubbing the coated surface with a finger at specified times and by observing whether the film rubs off.

Surface Resistance

After coating a surface of a substrate (which is made into a thin membrane like film or sheet) with an appropriate amount of the composition and heat treating it at a specified temperature for a specified period of time in a circulation oven, its surface resistivity is measured under the atmosphere of 25° C. and 65% of relative humidity, following the method in ASTMD-4854T.

Migration Property

After coating a surface of a substrate (which is made into a thin membrane like film or sheet) with an appropriate amount of the composition and heat treating it at a specified temperature for a specified period of time in a circulation oven, the coated surface is bonded with a 25 μm polyethylene terephthalate (PET) film and maintained for a day under a pressure of 10 kg/cm². Then the silicone contacted surface of the PET film is painted with a wide width oily ink marker and the appearance of its ink rejection is observed.

Dynamic Friction Coefficient

After preparing a cured coating film on the surface of a sheet substrate by the same method described in the release force test, a urethane rubber with a 200 g load is placed on its surface. The force required to pull the rubber in a parallel direction to the silicone surface at a 0.3 m/min rate is measured and a dynamic friction coefficient is calculated by dividing the required force by 200. (This method follows ASTMD-1894-63).

Synthesis Example

A 318 g sample (3 moles) of β-cyanoethyl methyl dimethoxy silane is placed in a one liter four necked flask. A 400 g amount of water with 0.2 wt % of hydrochloric acid is added to the flask drop by drop at room temperature. The mixture temperature is gradually raised after the drop wise addition and the methanol formed is eliminated to the outside of the reaction system using an ester adaptor. When the inside temperature reaches 100° C., 100 g of toluene is added and the reaction is completed by azeotropic dehydration. After removing the low temperature distillates under reduced pressure, 334 g of poly(cyanoethylmethyl)siloxane (I) is obtained (98% yield).

Then 370 g of dimethyl cyclotetrasiloxane and 18.6 g of 1,3-divinyl-1,1,3,3-tetramethyldisiloxane as a molecular terminal group are added to 113 g of this siloxane polymer (I). The mixture is reacted to equilibrium for five hours at 60° C. with 2.5 g of trifluoromethane sulfonic acid, a catalyst. Then, a 1.2 g amount of water is added and the mixture is neutralized with 50 g of sodium bicarbonate. Further, 5 g of active carbon and 50 g of sodium sulfate are added and the mixture is stirred for three hours, then filtered. After removing the low temperature distillates under reduced pressure, 446 g of siloxane polymer with vinyl groups (II) was obtained (89% yield). This polymer (II) is expressed by the following equation and possesses a viscosity of 267 cs, and an index of refraction $n_D^{25}$ of 1.418.

$$CH_2=CH-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_{50}-\left[\underset{\underset{CH_3}{|}}{\overset{\overset{CH_2CH_2CN}{|}}{Si}}-O\right]_{10}-\underset{\underset{CH_3}{|}}{\overset{\overset{CH_3}{|}}{Si}}-CH=CH_2$$

Then, 281.2 g of octamethylcyclotetrasiloxane, 8.6 g of 1,3,5,7-tetramethyl-1,3,5,7-tetravinylcyclotetrasiloxane and 18.6 g of 1,3-divinyl-1,1,3,3-tetramethyldisiloxane as a molecular terminal group are added to 226 g of the said siloxane polymer (I). The mixture was reacted using 2.7 g of trifluoromethane sulfonic acid as a catalyst and treated in the same way described in the synthesis of the polymer (II). A 486 g amount of siloxane polymer (III) is obtained (91% yield). This polymer (III) is expressed by the following equation and possesses a viscosity of 392 cs and an index of refraction $n_D^{25}$ of 1.454.

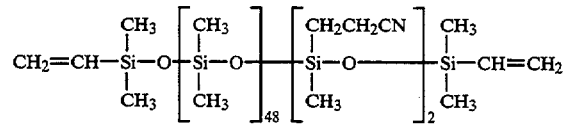

EXAMPLE 1

Into the 100 parts of the polymer (II) obtained in the synthesis example, 6 parts of methylhydrogen(dimethyl)polysiloxane, of which both molecular ends are sealed with trimethylsilyl groups, with 50 degrees of polymerization and with 80 mol % of methylhydrogensiloxane units, and 2 parts of 3-methyl-1-butyn-3-ol are added. After the uniform mixing, a platinum and vinyl siloxane complex is added by an amount equivalent to 200 ppm platinum and the silicone composition A is prepared.

Then this composition A is coated on the polyethylene laminated paper by a 0.6 g/m² of coating amount and its curability and adhesivity are measured at the temperature condition of 120° C.

Further, other physical properties are measured after curing it at 150° C. for 20 seconds. The results obtained are shown in the following Table 1.

EXAMPLE 2

Into the 100 parts of the polymer (III) obtained in the synthesis example, 5 pares of methylhydrogenpolysiloxane, of which both molecular ends are sealed with trimethylsilyl groups, with 40 degrees of polymerization, and 2 parts of 3-methyl-1-butyn-3-ol are added. After the uniform mixing, a platinum and vinyl siloxane complex is added by an amount equivalent to 200 ppm platinum and the silicone composition B was prepared. This composition B is used to treat the polyethylene laminated paper similarly as the composition A in Example 1 and the results shown in the following Table 1 are obtained.

COMPARISON EXAMPLE

The silicone composition C was prepared by the same treatment method described in Example 1, except that α,ω-dimethylvinylpolydimethylsiloxane with 60 degrees of polymerization is employed in place of the polymer (II). This composition C is used to treat the polyethylene laminated paper similarly as the composition A in Example 1 and the results of the obtained physical properties are shown in the following Table 1.

TABLE 1

| Example No. Composition | Example 1 A | Example 2 B | Comparison Example C |
|---|---|---|---|
| Curability (120° C. × 30 sec) | good | good | good |
| Release Force (g/5 cm) | 190 | 385 | 46 |
| Surface Resistance (Ω) | $4.9 \times 10^{12}$ | $9.6 \times 10^{10}$ | $<10^{13}$ |

TABLE 1-continued

| Example No. Composition | Example 1 A | Example 2 B | Comparison Example C |
|---|---|---|---|
| Adhesivity | good | good | good |
| Migration property | good | good | good |
| Dynamic Friction Coefficient (against urethane rubber) | 0.16 | 0.16 | 0.27 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An organopolysiloxane composition comprising
   (1) an organopolysiloxane having at least two alkenyl groups and 5 to 50 mol % of a chemical unit of formula

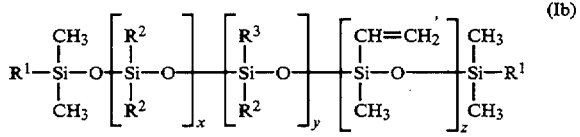

(Ib)

wherein each $R^1$ is independently hydroxyl or vinyl, each $R^2$ is independently methyl, ethyl, propyl, or 3,3,3-trifluoropropyl, $R^3$ is cyanoalkyl, and each of x, y, and z is an integer which is defined by the following ranges: $0.4 \leq x/(x+y+z) \leq 0.95$, $0.05 \leq y/(x+y+z) \leq 0.5$, and $0 \leq z/(x+y+z) \leq 0.1$;
   (2) an organohydrogen polysiloxane having at least three hydrogen atoms bonded to silicon atoms per molecule; and
   (3) a catalytic amount of platinum or a platinum compound.

2. The composition of claim 1, comprising about 100 parts by weight of (1), and about 1 to 100 parts by weight of (2), based on (1).

3. The composition of claim 2, comprising about 1 to 1000 ppm of (3), based on (1), calculated as platinum metal.

4. The composition of claim 1, comprising about 100 parts by weight of (1), and about 5 to 50 parts by weight of (2), based on (1).

5. The organopolysiloxane composition according to claim 1, wherein the organohydrogen polysiloxane of component (2) has the formula II

wherein $R^4$ is a monovalent hydrocarbon, c and d are numbers defined by $0 \leq c \leq 3$ and $0 \leq d \leq 3$, and $1.5 \leq c+d \leq 3$.

6. In a substrate having all adhesive coating, said coated substrate being peelable from a surface to which it is applied, the improvement wherein the coating is a composition according to claim 1.

* * * * *